(12) United States Patent
Polaganga et al.

(10) Patent No.: US 12,028,768 B2
(45) Date of Patent: *Jul. 2, 2024

(54) METHOD AND SYSTEM FOR CELL PRIORITIZATION

(71) Applicant: T-Mobile Innovations LLC, Overland Park, KS (US)

(72) Inventors: Roopesh Kumar Polaganga, Bothell, WA (US); Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,216

(22) Filed: Nov. 2, 2022

(65) Prior Publication Data
US 2023/0051643 A1  Feb. 16, 2023

Related U.S. Application Data

(63) Continuation of application No. 17/320,486, filed on May 14, 2021, now Pat. No. 11,523,321.

(51) Int. Cl.
*H04W 4/00* (2018.01)
*H04W 36/14* (2009.01)
*H04W 36/22* (2009.01)
*H04W 36/24* (2009.01)

(52) U.S. Cl.
CPC ........... *H04W 36/22* (2013.01); *H04W 36/14* (2013.01); *H04W 36/24* (2013.01)

(58) Field of Classification Search
CPC ..... H04W 36/22; H04W 36/14; H04W 36/24; H04W 88/06
USPC .......................................... 370/331; 455/312
See application file for complete search history.

(56) References Cited

U.S. PATENT DOCUMENTS

| | | | |
|---|---|---|---|
| 9,001,682 B2 * | 4/2015 | Kovvali | H04W 48/18 370/252 |
| 10,849,180 B2 | 11/2020 | Karimli et al. | |
| 2013/0028069 A1 * | 1/2013 | Pelletier | H04W 76/16 370/216 |
| 2020/0187218 A1 * | 6/2020 | Jia | H04W 72/085 |

FOREIGN PATENT DOCUMENTS

| | | |
|---|---|---|
| WO | 2020190195 A1 | 9/2020 |
| WO | 2020226644 A1 | 11/2020 |
| WO | WO-2020226644 A1 * | 11/2020 ............. H04L 5/001 |

* cited by examiner

*Primary Examiner* — Marcos Batista
(74) *Attorney, Agent, or Firm* — Jones Robb, PLLC

(57) ABSTRACT

Systems and methods are provided for cell prioritization. Methods involve monitoring resource usage on a first cell and comparing the monitored resource usage on the first cell to a predetermined threshold. The method additionally includes receiving a connection request from a hybrid wireless device capable of communicating using the first RAT and the second RAT and assigning the hybrid wireless device to the second cell when the monitored resource usage on the first cell meets the predetermined threshold.

20 Claims, 7 Drawing Sheets

METHOD AND SYSTEM FOR CELL PRIORITIZATION

This patent application is a continuation of U.S. patent application Ser. No. 17/320,486, filed on May 14, 2021, which is incorporated by reference in its entirety for all purposes.

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, long term evolution (LTE), etc.), and 5G new radio (NR). Deployment of the evolving RATs in a network provides numerous benefits. For example, newer RATs may provide additional resources to subscribers, faster communications speeds, and other advantages. However, newer technologies may also have limited range in comparison to existing technologies. To ensure consistent coverage through a wide geographic range, existing technologies such as 4G are often used in combination with newer technologies such as 5G NR.

Wireless devices or user equipment (UE) implemented in the network may be capable of using one or more of the RATs implemented in the network. For example, some wireless devices are configured to use 4G LTE, but are not capable of using 5G NR. Other wireless devices are capable of using both 4G LTE and 5G NR RATs. The wireless devices may be equipped with different chipsets in order to communicate using a particular technology. Accordingly, while networks have evolved to accommodate multiple RATs, not all wireless devices communicating within the networks are capable of utilizing all available technologies.

The 5G NR standard offers the possibility of adapting to existing LTE deployments and sharing a previously dedicated LTE spectrum. Network operators tend to deploy their 5G networks using (1) dedicated spectrum resources for NR; (2) Dynamic Spectrum Sharing (DSS); or (3) hybrid using both dedicated and DSS-NR cells. Thus, in the first instance of dedicated spectrum resources, when multiple RATs are used in combination, access nodes may utilize different frequency bands for deploying different RATs over a wireless air interface. For example, when a 5G RAT is used in combination with a 4G RAT, frequency band 25 may be utilized for the 4G RAT and frequency band 41 may be utilized for the 5G RAT. In the second instance, DSS allows 5G NR and 4G LTE to coexist while using the same spectrum through the deployment of both 4G LTE and 5G NR in the same frequency band. In the third instance or hybrid mode, DSS may be utilized in combination with dedicated NR resources. Thus, the third instance employs both dedicated NR cells and combined DSS-NR cells.

While the hybrid deployment mode has numerous advantages, problems also exist in this configuration. For example, in networks implementing the hybrid deployment scenario, a combined DSS-NR cell may become congested with both LTE and NR traffic. In contrast, the dedicated NR cell may be under-utilized serving a single type of traffic, e.g., NR traffic.

Accordingly, a solution is needed for managing the dedicated cells in order to mitigate congestion in combined cells such that performance impacts for wireless devices using all available technologies are minimized.

OVERVIEW

Exemplary embodiments described herein include systems, methods, and access nodes for prioritizing dedicated cells in a network using a hybrid DSS approach. In embodiments set forth herein, a method includes multiple steps. The method includes monitoring resource usage on a first cell accommodating a first RAT and a second RAT. The method additionally includes determining that the monitored resource usage on the first cell meets a predetermined threshold. Further steps include identifying a hybrid wireless device capable of communicating using the first RAT and the second RAT and assigning the hybrid wireless device to a second cell dedicated to the first RAT when the monitored resource usage on the first cell meets the predetermined threshold.

In additional embodiments, a method is provided that includes utilizing a hybrid deployment scenario to deploy a first cell accommodating a first RAT and a second RAT and a second cell dedicated to the first RAT. The method additionally includes monitoring resource usage on the first cell and comparing the monitored resource usage on the first cell to a predetermined threshold. The method additionally includes receiving a connection request from a hybrid wireless device capable of communicating using the first RAT and the second RAT and assigning the hybrid wireless device to the second cell when the monitored resource usage on the first cell meets the predetermined threshold.

In a further embodiment, an access node is provided. The access node includes a processor programmed to perform multiple operations. The operations include monitoring resource usage on a first cell accommodating a first RAT and a second RAT and determining that the monitored resource usage on the first cell meets a predetermined threshold. The operations further include identifying a hybrid wireless device capable of communicating using the first RAT and the second RAT and assigning the hybrid wireless device to a second cell dedicated to the first RAT when the monitored resource usage on the first cell meets the predetermined threshold.

Further, in embodiments set forth herein, the first cell and the second cell have overlapping coverage areas. Additionally, the first cell may be deployed as a dynamic spectrum sharing (DSS) cell utilizing the first RAT and the second RAT in a same frequency band.

DETAILED DESCRIPTION

Figure 1:
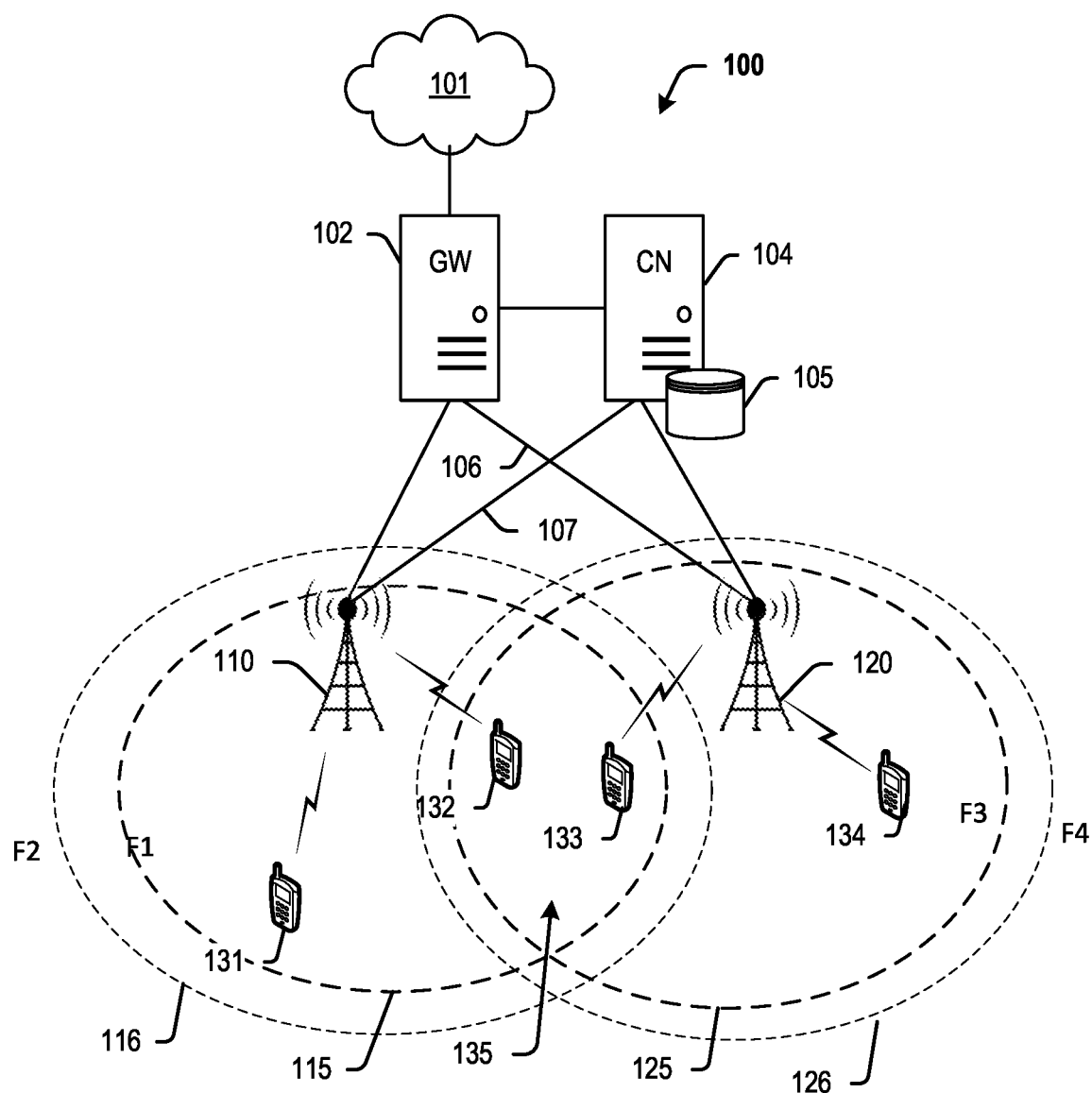
FIG. 1 depicts an exemplary system for wireless communication, in accordance with the disclosed embodiments.

Exemplary embodiments described herein include systems, methods, and access nodes for assigning wireless devices to a cell based on cell loading conditions and capabilities of the wireless device. Through the assignment, dedicated cells deploying only one RAT can be prioritized over cells accommodating multiple RATs in order to improve overall network performance. For example, a network may utilize DSS to allocate a spectrum to both 4GLTE and 5G NR, thus allowing deployment of both 4GLTE and 5G NR in the same frequency band. The allocation may be made intelligently and dynamically, for example, by an access node scheduler based on wireless device requirements. However, despite the intelligent allocation, DSS cells may become overloaded. The issue of overloading DSS cells becomes prominent with the introduction of guaranteed bit rate (GBR) type NR services like Voice over NR (VoNR). In current implementations, 4G LTE UEs trying to access common resources in a DSS cell can be rejected due to increased NR traffic (especially GBR traffic) and may therefore end up being rejected for connection to the DSS cell.

Embodiments disclosed herein operate in an environment implementing a hybrid model of DSS. Thus, while some cells may allow spectrum sharing between two RATs, such as, for example, 4G LTE and 5G NR, other cells may be dedicated to a single RAT, such as the 5G NR RAT. When this model is implemented, the cells allowing sharing of spectrum resources may become overcrowded and the dedicated cells may be underutilized. Thus, embodiments disclosed herein prioritize the dedicated cells by assigning capable devices to the dedicated cells under predetermined conditions. In some embodiments, the capable devices may be identified upon receipt of a connection request, while in other embodiments, capable devices may already be connected and may be identified based on a UE capability report when resource usage in the shared cell meets a predetermined threshold.

In embodiments disclosed herein, a cell or wireless network may be provided by an access node. The access node may utilize one or more antennas to communicate with wireless devices or UEs. Performance at a particular wireless device may be dependent on a number of factors including, for example, antenna performance parameters and wireless device location within a cell or a sector. Because certain network conditions are likely to result in poor performance of wireless devices in the network, embodiments provided herein assign wireless devices to a cell based on loading conditions and wireless device capabilities. The assignment may be dynamically performed based on reported wireless device characteristics and predetermined resource usage thresholds.

Exemplary embodiments described herein include systems, methods, and access nodes for prioritizing dedicated cells in a network using a hybrid DSS approach. In embodiments set forth herein, multiple cells in the hybrid DSS network may have overlapping coverage areas. Thus, in many locations, wireless devices may be able to connect to one of multiple cells. Some of the cells may be dedicated to a particular RAT and other cells may be DSS cells that allow sharing of a spectrum between multiple RATs. In embodiments set forth herein, a processor monitors resource usage on a first cell, which may be a DSS cell accommodating both a first RAT and a second RAT. The first RAT may, for example be 4G LTE RAT and the second RAT may be a 5G NR RAT.

The resource usage monitored may be combined resource usage of the wireless devices in the first cell, including devices using or capable of using both available technologies. Resource usage may be monitored through physical resource block (PRB) usage in the cell. Alternatively, resource usage may be monitored based on a number of connected devices. Other methods for monitoring resource usage may also be implemented.

The method additionally includes comparing the monitored resource usage to a predetermined resource usage threshold. The predetermined resource usage threshold may be determined based on network characteristics and may be specific to the network. The threshold may, for example, be a percentage of resource block utilization or a number of connected devices. In the event that the monitored resource usage on the first cell meets the predetermined threshold, embodiments set forth herein prioritize dedicated cells over DSS cells. The threshold may be stored at an access node and retrieved by the processor for use.

In order to prioritize the dedicated cells, embodiments set forth herein identify hybrid wireless devices capable of utilizing both RATs. The identified hybrid wireless devices may be assigned to dedicated cells rather than DSS cells. In embodiments set forth herein, the hybrid devices are identified when a connection request is received from the hybrid wireless devices. In order to identify hybrid wireless devices, a processor or processing node associated with an access node may determine whether a wireless device is capable of utilizing multiple RATs or a single RAT. In order to make this determination, access nodes may receive communications from wireless device such as a UE capability message to indicate (or report) to the access node. Alternatively, in another exemplary embodiment, the wireless devices can be configured with a chipset type or version, which may be provided to the access node during an attach procedure. Other methods of communicating the capabilities of the wireless devices are within scope of the disclosed embodiments.

When the access node, processor, or processing node identifies a hybrid or dual capable wireless device, it may be programmed to assign the dual capable devices to a dedicated cell. Through this assignment, resources in the DSS cell will become available to devices that are not capable of communicating using the dedicated cell. Thus, the assignment may improve overall network performance.

Therefore, in accordance with embodiments disclosed herein, methods and systems identify wireless device characteristics and compare monitored resource usage in a DSS cell to a predetermined threshold. These steps may be performed in any order. Based on the wireless device characteristics and the determination that the threshold has been met, the methods and system assign the wireless devices to an appropriate cell of a hybrid network. Through this process, embodiments set forth herein improve the user experience and optimize resource utilization within the network for multiple technologies.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

The term "cell" refers to a geographical area covered by a frequency emitted by a base station or cell site in a cellular network. Each cell may be given a number of frequencies or channels. Different channels may be used between neighbor cells to avoid interference and provide quality of data transmission. Cells may be served by multiple cell sites or base transceiver stations.

An exemplary system described herein includes at least an access node (or base station), such as an evolved NodeB (eNodeB), a next generation NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations of prioritizing dedicated cells through assignment of wireless devices may be implemented as computer-readable instructions or methods, and processing nodes may be implemented on the network for executing the instructions or methods. The processing node may include a processor included in the access node or a processor included in any controller node in the wireless network that is coupled to the access node.

Embodiments disclosed herein operate in a heterogeneous network utilizing both 4G LTE and 5G NR. Embodiments of the network disclosed herein utilize dedicated NR cells and DSS-NR cells having overlapping coverage areas. Resource usage on the DSS-NR cells is monitored. When the resource usage meets a predetermined threshold, capable wireless devices may be re-directed to the dedicated NR cell having an overlapping coverage area with the DSS-NR cell.

FIG. 1 depicts an exemplary system 100 for use in conjunction with embodiments disclosed herein. System 100 comprises a communication network 101, gateway 102, controller node 104, access nodes 110 and 120, and wireless devices 131, 132, 133, and 134. Access nodes 110 and 120 are illustrated as deploying one or more cells 115, 116, 125, and 126 at predetermined frequencies F1, F2, F3, and F4. The frequencies F1, F2, F3, and F4 may represent one or more bands. As illustrated, the cells, 115, 116, 125, and 126 are all overlapping.

Thus, access node 110 is configured to deploy radio air interfaces utilizing a first frequency band F1 and a second frequency band F2. In this exemplary embodiment, access node 110 deploys a radio air interface utilizing frequency band F1 to create a cell 115 and a radio air interface utilizing frequency band F2 to create cell 116. The frequency bands F1 and F2 may be the same or different.

Access node 120 is illustrated as deploying a cell 125 associated with frequency band F3 and a cell 126 associated with a frequency band F4. Frequency band F3 may be the same or different from frequency band F4. In either case, each access node 110, 120 can deploy one or more radio air interfaces that utilize one or more frequencies, enabling wireless communication with wireless devices 131, 132, 133, 134.

As shown herein, wireless devices 131, 132 attach to access node 110 via frequency bands F1 or F2. Similarly, wireless devices 133, 134 attach to access node 120 via frequency bands F3 or F4. Although access nodes 110, 120 and wireless devices 131, 132, 133, 134 are illustrated in FIG. 1, any number of access nodes and wireless devices can be implemented within system 100.

Wireless devices 131, 132, are located within cells or coverage areas 115 and 116 and access network services from access node 110. Wireless device 133 and 134 are located within cells or coverage areas 125 and 126 and access network services from access node 120. Further, wireless devices 132 and 133 are located within area 135 formed by an overlap of the cells 115, 116, 125, and 126. Area 135 may, in some instances be a potential interference area or an area with poor RF performance.

In the illustrated embodiments, some of the cells 115, 116, 125, and 126 may be dedicated cells and others may be DSS cells. For example, access node 110 may deploy the cell 115 as a DSS cell. Accordingly, the frequency band F1 may be shared between 4G LTE and 5G NR technologies. Further, the cell 116 may be a 5G NR dedicated cell. Similarly, the access node 120 may deploy both a DSS cell and a dedicated cell. For example, cell 125 may be a DSS cell and the cell 126 may be a dedicated cell, wherein the DSS cell 125 accommodates 4G LTE and 5G NR on the frequency band F3 and the dedicated cell 126 accommodates 5G NR technology within the frequency band F4. These configurations are merely exemplary, as some access nodes may deploy only DSS cells and others may deploy only dedicated cells.

Further, a scheduling entity (within, for example, one or both of access nodes 110, 120, or controller node 104) may be configured to allocate resources and provide handover instructions or attach instructions based on loading conditions and device capabilities, thereby improving performance in the network. For example, when resource block usage for a DSS cell, e.g., cell 115 exceeds a certain percentage, e.g., 60%, when a wireless device, such as device 131 attempts to connect to the access node 110, the access node 110 may determine whether the wireless device 131 is capable of communicating using the dedicated technology of the dedicated cell 116. Thus, if the cell 115 uses both 4G LTE and 5G NR and the cell 116 is dedicated to 5G NR, the access node 110 may determine if the device 131 is capable of communicating using 5G NR. If the device 131 is capable of communicating using 5G NR, the access node 110 may assign the wireless device 131 to the cell 116. Similar steps may be performed for all of the wireless devices when the DSS cells have usage that meets a predetermined threshold, such as the above-mentioned 60% threshold. In some embodiments, these steps are performed during a connection request and the assignment may apply only to devices requesting connection. In other embodiments, the steps may be performed for already connected devices in the DSS cell.

In embodiments disclosed herein, one or more of access nodes 110, 120 may comprise logic for performing operations for evaluating loading conditions on the DSS cells and further for determining capabilities of the wireless devices. As previously mentioned, loading conditions may be monitored based on percentage of resource blocks utilized. Other factors may be considered such as signal quality parameters on the DSS cell and/or the number of connected devices on the DSS cell. The capabilities of the wireless device may be determined based on a UE capability report or any other suitable method.

Access nodes 110, 120 can be any network node configured to provide communication between wireless devices 131-134 and communication network 101, including standard access nodes and/or short range, low power, small access nodes. For instance, access nodes 110, 120 may include any standard access node, such as a macrocell access node, base transceiver station, a radio base station, next generation NodeBs (gNBs) in 5G networks, or enhanced eNodeBs (eNBs) in 4G/LTE networks, or the like. In an exemplary embodiment, a macrocell access node can have a coverage area 115, 125 in the range of approximately five kilometers to thirty five kilometers and an output power in the tens of watts. In other embodiments, access nodes 110, 120 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100. Further, the access nodes 110, 120 may operate using E-UTRAN-NR Dual Connectivity (EN-DC) using 4G LTE and 5G NR. In this scenario, access nodes 110, 120 can be configured to communicate using both RATs at the same time. A processing node within system 100 (for example, communicatively coupled to access nodes 110, 120, or any other network node) can be configured to determine whether or not wireless device 131 is capable of communicating using both RATs and instruct the access node 110 to broadcast an indicator in, for example, a system information message. Responsive to the indicator, wireless device 131 can attach to access node 110 which can use the 4G carrier to control and set up a dual connectivity session with wireless device 131. In other words, control information (including SIB messages) may be transmitted from the access node 110 using the 4G LTE air interface, while the 5G NR air interface is utilized for transmission of data.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131-134 may be any device, system, combination of devices, or other such communication platform capable of communicating wirelessly with access nodes 110, 120 using one or more frequency bands deployed therefrom. Wireless devices 131-134 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Further, the wireless devices may be capable of utilizing one technology or more than one technology. The wireless devices may be hybrid devices capable of utilizing multiple technologies, such as 5G NR and 4G LTE. Further, the wireless devices can be high power UEs (HPUEs) or lower power UEs (LPUEs). Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-134. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. Alternatively, the controller node 104 may include, for example one or more of a Network Slice Selection Function (NSSF), a Network Exposure Function (NEF), a Network Repository Function (NRF), a Policy Control Function, a Unified Data Management (UDM) function, an Application Function (AF), an Access and Mobility Function (AMF) and a Session Management Function (SMF). One of ordinary skill in the art would recognize that controller node 104 is not limited to any specific technology architecture, such as Long Term Evolution (LTE) or 5G NR can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as thresholds, cell parameters, and positions and characteristics of wireless devices 131-134. The database may further store defined handover thresholds, scheduling schemes and resource allocations for each of access nodes 110, 120 and wireless devices connected thereto, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
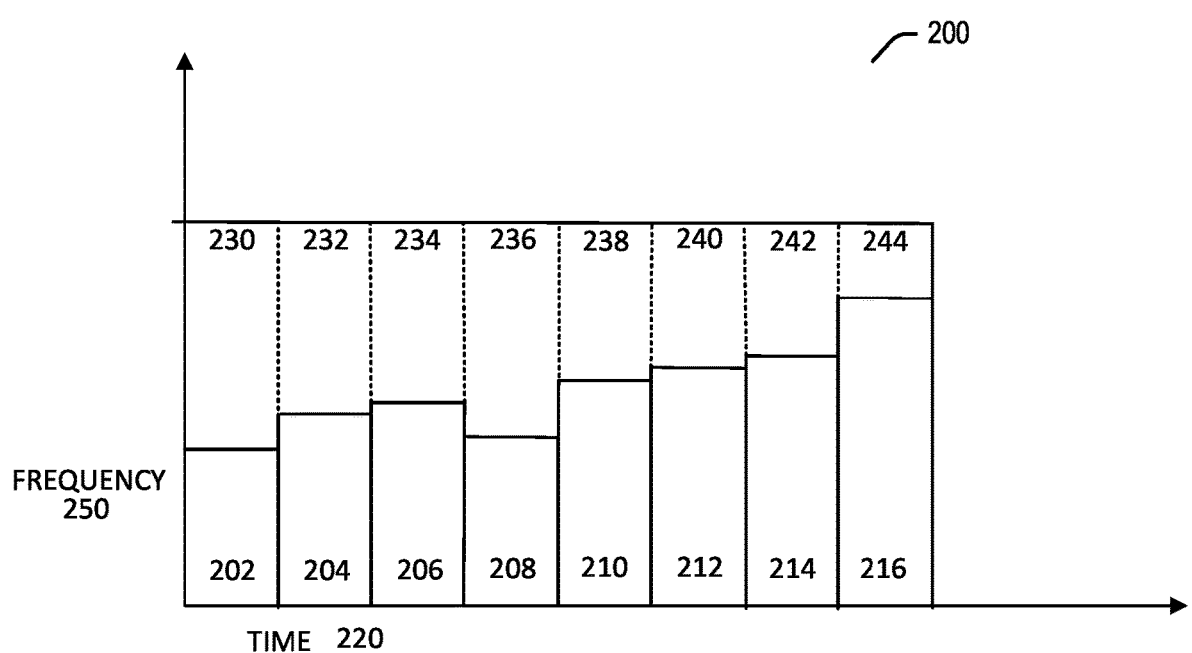
FIG. 2 illustrates an exemplary configuration for DSS deployment in accordance with disclosed embodiments.

FIG. 2 depicts an exemplary system 200 to illustrate DSS. An x-axis 220 represents time and a y-axis 250 represents frequency. Blocks 202, 204, 206, 208, 210, 212, 214, and 216 may represent spectrum allotted to a first RAT and blocks 230, 232, 234, 236, 238, 240, 242, and 244 may represent spectrum allotted to a second RAT. The first RAT may, for example, be a 5G NR RAT and the second RAT, may, for example be a 4G LTE RAT.

Accordingly, DSS enables the parallel use of LTE and 5G in the same frequency band. An access node, such as 110 or 120 or other processor in the network dynamically determines the demand for 5G and LTE in real-time. The processor divides the available bandwidth independently and decides dynamically which RAT or mobile communications standard utilizes the available frequencies.

Thus, on a DSS cell, such as cell 115 or 125, 5G NR capable devices utilize the 5G standard or RAT and 4G devices that are not capable of utilizing the 5G standard utilize the 4G standard in the same cell. A single antenna in the access node 110 or 120 may be capable of providing DSS. For the network operator, DSS eliminates the need to purchase an additional frequency spectrum in order to effect 5G expansion. Thus, DSS can be utilized to facilitate 5G expansion. Furthermore, DSS can provide advantages to 4G LTE users by providing more efficient frequency allocation and optimized utilization leads to a better overall user experience.

FIG. 2 illustrates exemplary dynamic variation in spectrum allotted to the two technologies of the DSS cell over time. The dynamic allotment of spectrum may increase to allot more spectrum to 5G NR over time as shown in blocks 210, 212, 214, and 216. Hybrid deployments, such as those illustrated in FIG. 1 can be utilized advantageously. When the combined DSS-NR cell becomes congested with both LTE and NR traffic, the dedicated NR cell may be underutilized serving a single type of traffic, e.g., NR traffic. Thus, embodiments as disclosed herein prioritize the dedicated cell in these instances so that 5G NR traffic can be assigned to the dedicated cell, such as cell 116 or 126.

Figure 3:
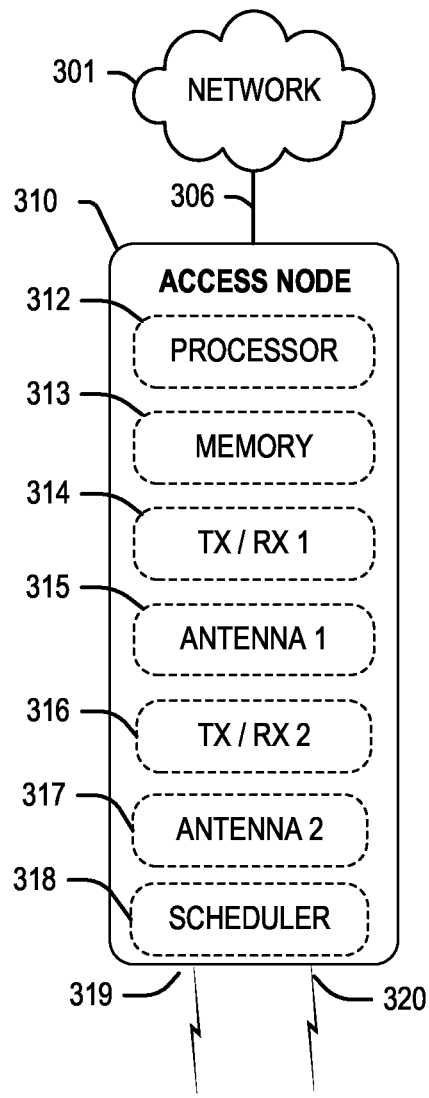
FIG. 3 depicts an access node in accordance with disclosed embodiments.

FIG. 3 depicts an exemplary access node 310. Access node 310 may comprise, for example, a macro-cell access node, such as access node 110, 120 described with reference to FIG. 1. Access node 310 is illustrated as comprising a processor 312, memory 313, transceiver TX/RX 1 314, and antenna 1 315, transceiver TX/RX 2 316, antenna 2, 317, and scheduler 318. The first transceiver 314 and antenna 315 may be provided for deploying a radio air interface utilizing a first frequency band, and the second transceiver 316 and antenna 317 may deploy a radio air interface utilizing a second frequency band. Two pairs of transceivers and antennae are illustrated herein solely to simplify the written description, and it may be evident to those having ordinary skill in the art, that any combination of transceivers and antennae may be incorporated in order to deploy carriers of multiple frequencies, formed beams, MU-MIMO data streams, and/or to facilitate communication with other network nodes on network 301. Processor 312 executes instructions stored on memory 313, while transceivers 314 and 316 and antennas 315 and 317 enable wireless communication with other network nodes, such as wireless devices and other nodes. For example, access node 310 may be configured to identify wireless device characteristics, identify resource usage thresholds, monitor resource usage, and assign the wireless devices to a cell based on these factors. Scheduler 318 may be provided for scheduling resources based on the presence of the wireless devices. These features may be enabled by access node 310 comprising two co-located cells, or antenna/transceiver combinations that are mounted on the same structure. Network 301 may be similar to network 101 discussed above. The wireless devices may operate in carrier aggregation mode, during which a wireless device utilizes more than one carrier, enabling the wireless devices to communicate with access node 310 using a combination of resources from multiple carriers.

Figure 5:
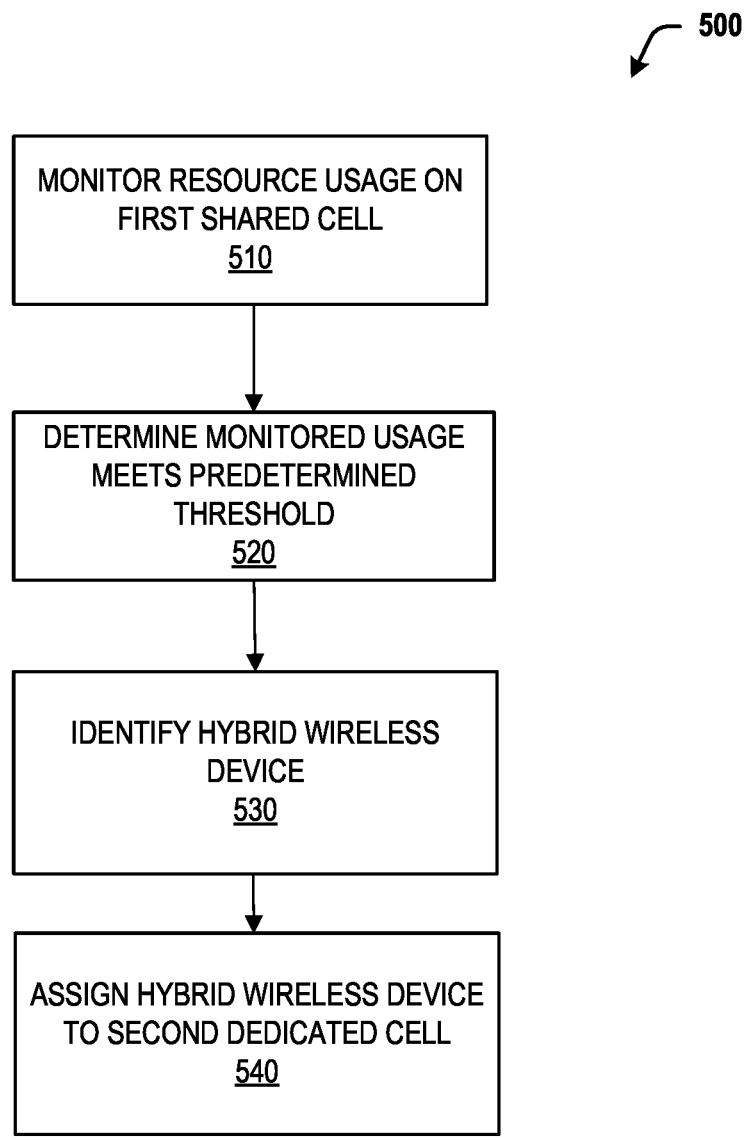
FIG. 5 depicts an exemplary method for cell prioritization in accordance with disclosed embodiments.

Further, instructions stored on memory 313 can include instructions for dynamically assigning a wireless device to a cell, which will be further explained below with reference to FIGS. 5-7. The instructions may facilitate identifying characteristics of UEs, monitoring resource usage, comparing the monitored resource usage to a predetermined threshold, and assigning the UEs based on these factors to an appropriate cell.

Figure 4:
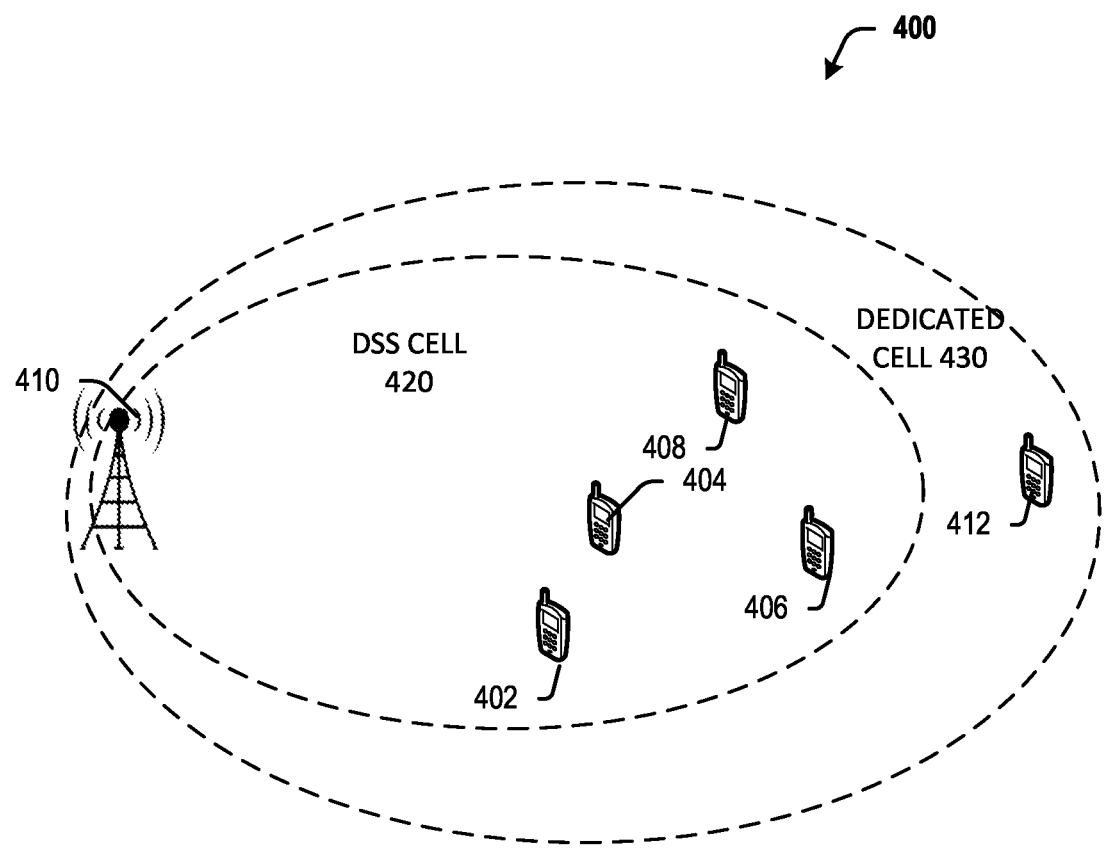
FIG. 4 depicts an exemplary environment for cell prioritization in accordance with the disclosed embodiments.

FIG. 4 depicts a scenario for implementing a method for cell prioritization in accordance with embodiments set forth herein. An access node 410, similar to the above-discussed access node 310 may be provided. The access node 410 may be equipped with antennas to deploy a DSS cell 420 and a dedicated cell 430. The cells 420 and 430 have an area of overlapping coverage. In embodiments set forth herein, a processor of the access node 410 controls the DSS cell 420 to dynamically divide resources between two RATs or standards, such as 4G LTE and 5G NR. The processor further monitors resource usage on the DSS cell 420 and compares the monitored resource usage to a predetermined resource usage threshold. Wireless devices 402, 404, 406 and 408 may all be consuming resources within the DSS cell 420, whereas wireless device 412 is assigned to the dedicated cell 430 and therefore does not consume DSS resources. In an illustrative embodiment, the resource usage threshold on the DSS cell 420 may be 50% and the resource usage may be monitored at 60%. In this instance, the processor determines that the resource usage in the DSS cell 420 meets the predetermined resource usage threshold.

Upon making this determination, the processor of the access node 410 may check capabilities of UEs requesting a connection. For example, if wireless device 408 is requesting a connection, the access node 410 may determine if the UE is a hybrid or dual capable UE. If the wireless device 408 is capable of utilizing both technologies of the DSS cell, the access node 410 assigns the UE 408 to the dedicated cell 430. In one embodiment, when the DSS cell 420 is heavily loaded, the access node 410 may check capabilities of UEs already connected in the DSS cell 420 and may re-assign dual capable UEs to the dedicated cell 430.

The disclosed methods for cell prioritization based on resource usage and wireless device capabilities are further discussed with reference to FIGS. 5-7. FIG. 5 illustrates an exemplary method 500 cell prioritization. The method may occur in dynamically in real time or at predetermined intervals. Method 500 may be performed by any suitable processor discussed herein, for example, a processor included in access node 110, 120, 310, or 410, or a processor included in controller node 104 or at another location in the network 101. For discussion purposes, as an example, method 500 is described as being performed by a processor included in access node 110.

Method 500 starts in step 510 when the access node 110 monitors resource usage on a first shared cell. The first shared cell may be a DSS cell that allocates its spectrum between 5G NR and 4G LTE. The access node 110 may monitor the resource usage by determining a percentage of resource blocks utilized by the wireless devices communicating in the first shared cell.

In step 520, the access node 110 determines that the monitored resource usage in the first shared cell meets a predetermined threshold. The predetermined threshold may have been previously set based on network parameters and characteristics and may be set to a specific percentage of resource block usage in the first shared cell. For example, the predetermined threshold may be set to 40%, 45%, 50% or other percentage appropriate for the network.

In step 530, the access node identifies a hybrid wireless device. The hybrid wireless device is capable of communicating utilizing two different RATs or standards. For example, the hybrid wireless device may be capable of communicating using 5G NR and 4G LTE. In embodiments provided herein, the hybrid wireless device is identified in response to sending an attach request during an attempt to connect to the access node. In other embodiments, the hybrid wireless device may be identified after it is already connected to the access node 110. The access node 110 may make this determination using various methods. For example, the hybrid wireless devices may be configured with a chipset type or version, which may be provided to the access node 110 during an attempt to connect. Alternatively, the hybrid wireless device may send a UE capability message to the access node to indicate its capabilities. Accordingly, a processor of the access node 110 may determine that the wireless device interacting with the access node 110 is a hybrid wireless device.

In step 540, the access node 110 assigns the hybrid wireless device to the second cell, which is a dedicated cell. Thus, if the first cell is a DSS cell accommodating 5G NR and 4G LTE, the second cell may be dedicated to 5G NR technology. The assignment may be accomplished, for example, by an instruction sent by the access node 110 to the wireless device for example by utilizing an RRC connection reconfiguration message or another message directed specifically to the wireless device. The assignment of the hybrid wireless device to the dedicated cell ensures that the dedicated cell will not be underutilized and further may improve performance for 4G LTE devices that are sharing a spectrum with 5G NR devices in the first DSS cell.

Figure 6:
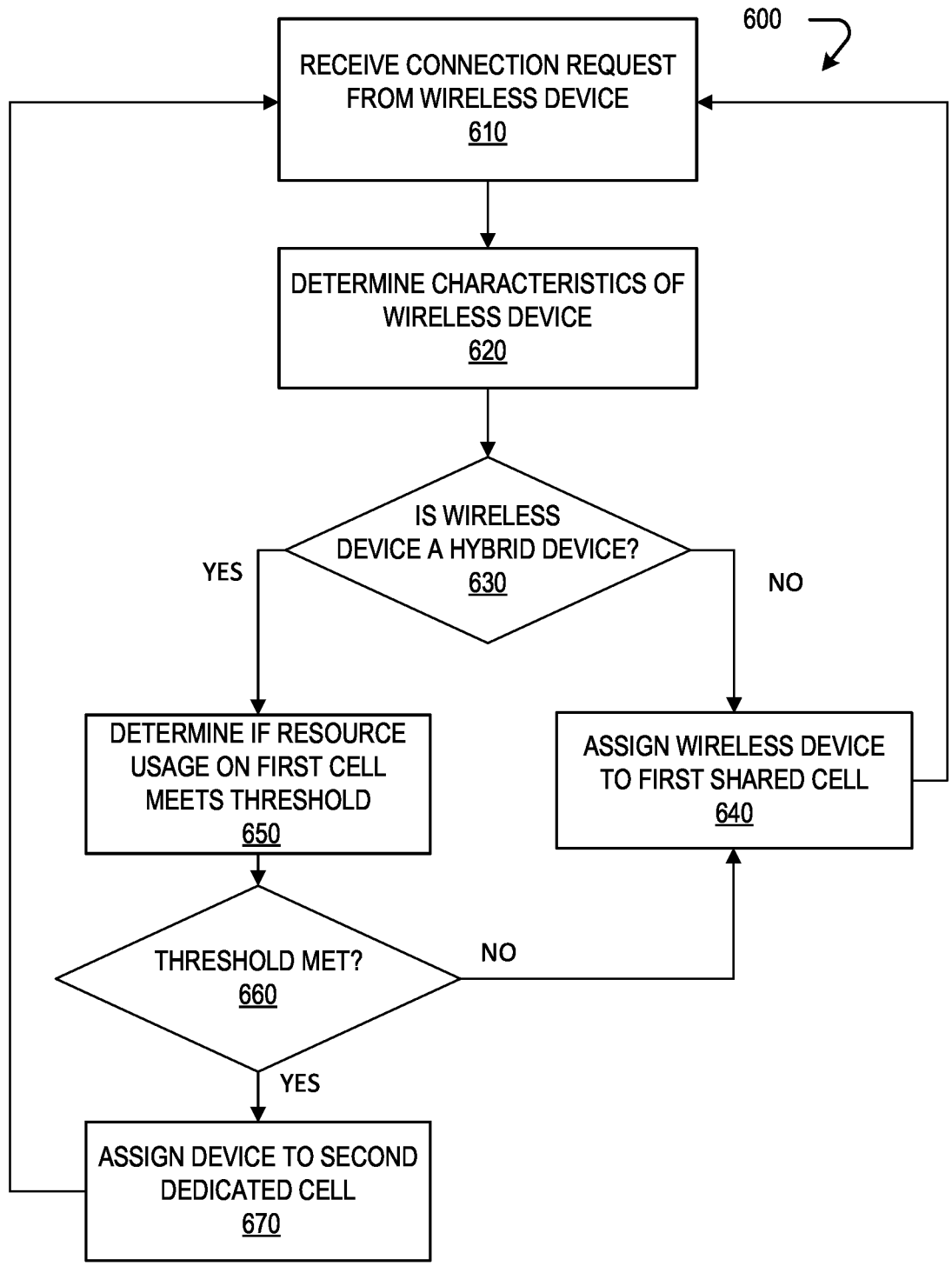
FIG. 6 depicts another exemplary method for cell prioritization in accordance with disclosed embodiments.

The method of FIG. 6 illustrates a method 600 for cell prioritization in accordance with disclosed embodiments. Method 600 may be performed by any suitable processor discussed herein, for example, a processor included in access node 110, 120, 310, or 410, or a processor included in controller node 104 or at another location in the network. For discussion purposes, as an example, method 600 is described as being performed by a processor included in access node 110.

In step 610, the access node 110 receives a connection request from the wireless device. The connection request may include information about the wireless device, such as a UE capability report or a chipset version. In step 620, the access node 110 determines characteristics of the wireless device. Specifically, the access node 110 may determine if the wireless device is a hybrid wireless device capable of communicating over multiple RATs. In embodiments set forth herein, the determination is made based on information transmitted by the wireless device during its connection request. Alternatively, the access node 110 may request additional information from the wireless device in order to make the determination.

If the wireless device is determined not to be a hybrid wireless device in step 630, the access node 110 assigns the wireless device to the shared DSS cell in step 640 as the wireless device does not have the capability to communicate in the dedicated cell. However, if the access node 110 determines that the wireless device is a hybrid wireless device in step 630, the access node 110 determines if resource usage on the shared DSS cell meets a predetermined threshold in step 650. As set forth above, the resource usage may be determined based on a percentage of utilized resource blocks allotted to the shared DSS cell. Alternatively, resource usage may be determined based on a number of devices connected in the shared DSS cell. In this case, the predetermined threshold would be a number of connected devices. Signal performance parameters may also be evaluated to measure resource utilization and set the threshold.

In step 650, the access node 110 determines whether usage on the shared DSS cell meets a predetermined threshold. The threshold may be set based on network characteristics and may be set to a percentage of utilized resource blocks for the shared DSS cell. For example, the threshold may be set to 50% of resource block usage. Alternatively, the threshold may be set to a specific number of connected devices.

If the threshold is not met in step 660, the access node 110 may assign the wireless device to the first shared cell in step 640. However, if the threshold is met in step 660, the access node 110 assigns the wireless device to the second dedicated cell in step 670. The assignment may be accomplished, for example, by an instruction sent by the access node to the wireless device for example by utilizing an RRC connection reconfiguration message or another message directed specifically to the wireless device. Thus, the method of FIG. 6 may be used to prioritize cells upon receiving connection requests and the devices already connected to the DSS cell may remain connected regardless of the result of the comparison of the monitored resource usage to the resource usage threshold.

Figure 7:
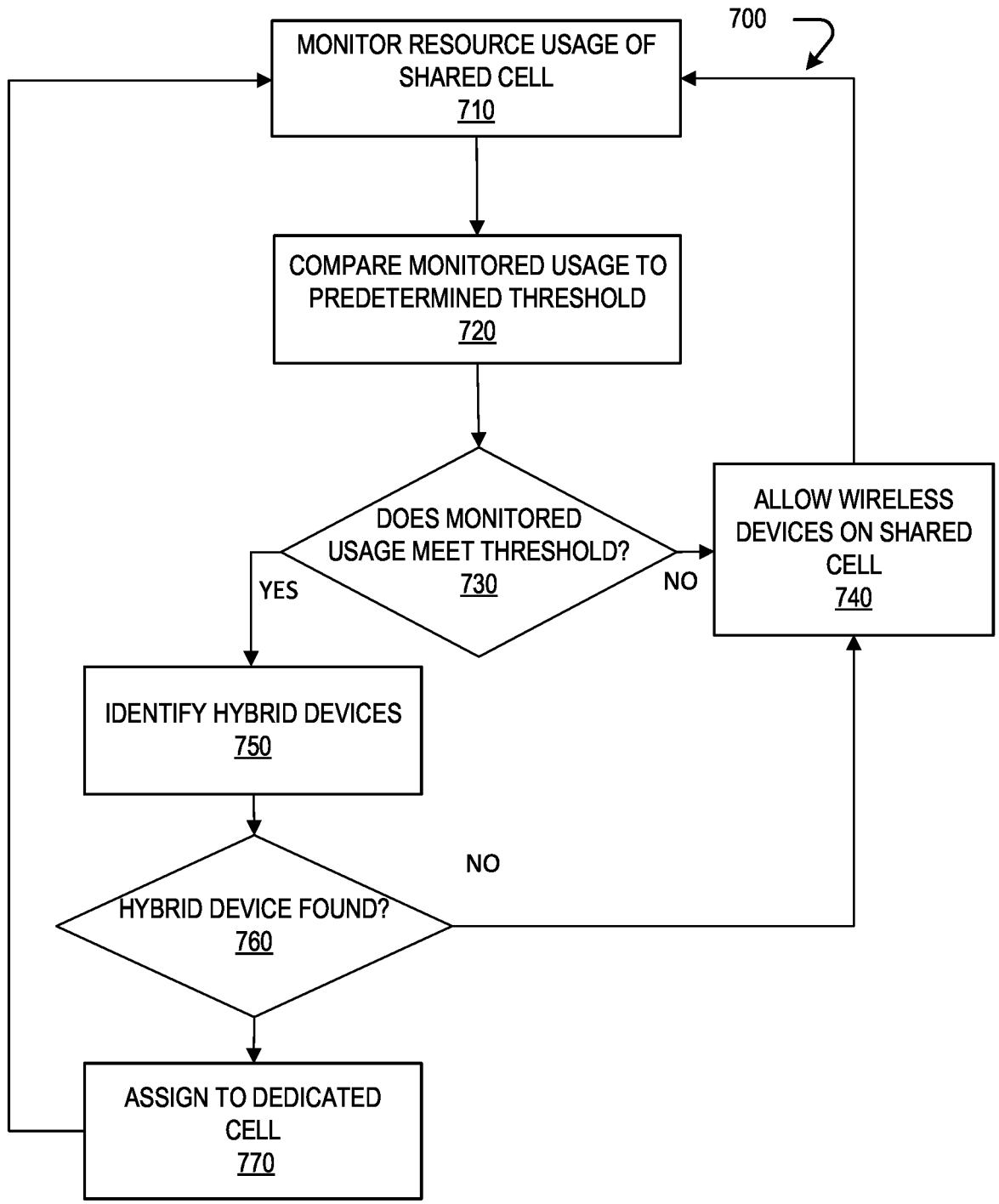
FIG. 7 depicts another exemplary method for cell prioritization in accordance with disclosed embodiments.

The method of FIG. 7 illustrates a method 700 for cell prioritization based on resource usage and device capabilities. Method 700 may be performed by any suitable processor discussed herein, for example, a processor included in access node 110, 120, 310, 410 or a processor included in controller node 104 or a processor at another location in the network. For discussion purposes, as an example, method 700 is described as being performed by a processor included in access node 110.

In step 710, the access node 110 monitors resource usage of the shared DSS cell. As set forth above, the resource usage may be determined based on a percentage of utilized resource blocks allotted to the shared DSS cell. Alternatively, resource usage may be determined based on a number of devices connected in the shared DSS cell. Signal performance parameters may also be evaluated to measure resource utilization.

In step 720, the access node compares the monitored resource usage to a predetermined threshold. The threshold may be set based on network characteristics and may be set to a percentage of utilized resource blocks for the shared DSS cell. For example, the threshold may be set to 50% of resource block usage. Alternatively, the threshold may be set to a specific number of connected devices.

In step 730, the access node 110 determines if the monitored resource usage meets the predetermined resource usage threshold. If the threshold is not met, wireless devices may remain connected within the DSS cell in step 740. However, if the threshold is met, in step 730, the access node 110 identifies characteristics of the wireless devices in step 750. Specifically, the access node 110 determines whether the wireless devices are hybrid wireless devices capable of communicating using both technologies of the DSS cell. The identification may be made at the access node 110, for example, based on notifications sent by the wireless device to the access node using any of the methods set forth above with respect FIGS. 5 and 6.

In step 760, when the access node 110 identifies hybrid devices, the hybrid devices are assigned to the dedicated cell in step 770. However, if the access node 110 does not identify hybrid devices in step 760, the non-hybrid devices may remain connected in the shared DSS cell in step 740. Thus, the method 700 may be utilized to re-assign hybrid devices that are already connected to the shared DSS cell when the resource usage threshold is met.

In some embodiments, methods 500, 600, and 700 may include additional steps or operations. Furthermore, the methods may include steps shown in each of the other methods. As one of ordinary skill in the art would understand, the methods 500, 600, and 700 may be integrated in any useful manner. Additionally, in order to optimize a heterogeneous network, the methods disclosed may be performed for multiple devices in the network so that the wireless devices can be appropriately assigned.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
providing a first cell accommodating a first radio access technology (RAT) and a second RAT and providing a second cell dedicated to the first RAT, the first cell and the second cell having overlapping coverage areas;

detecting a predetermined loading condition for the first cell;

receiving a connection request from a wireless device;

identifying the wireless device as a hybrid wireless device capable of communicating using the first RAT and the second RAT; and assigning the hybrid wireless device to the second cell dedicated to the first RAT when the predetermined loading condition for the first cell is detected, thereby prioritizing the second cell employing only the first RAT over the first cell accommodating multiple RATs.

2. The method of claim 1, further comprising monitoring resource usage on the first cell.

3. The method of claim 2, further comprising comparing the monitored resource usage on the first cell to a predetermined threshold and determining the monitored resource usage meets the predetermined threshold in order to detect the predetermined loading condition.

4. The method of claim 3, wherein the predetermined threshold is a percentage of resource block usage.

5. The method of claim 1, further comprising receiving a chipset version with the connection request and using the chipset version for identifying the wireless device as a hybrid wireless device.

6. The method of claim 1, further comprising sending a RRC connection reconfiguration request to the wireless device to assign the wireless device to the second cell.

7. The method of claim 1, further comprising receiving a connection request from a second wireless device and determining the second wireless device is not a hybrid wireless device.

8. The method of claim 7, further comprising assigning the second wireless device to the first cell.

9. The method of claim 1, wherein the first cell deploys a 5G RAT and a 4G RAT and the second cell deploys only the 5G RAT.

10. The method of claim 1, further comprising deploying the first cell as a dynamic spectrum sharing (DSS) cell and dynamically managing resources available for each of the first RAT and the second RAT.

11. The method of claim 1, further comprising receiving a capability report from the hybrid wireless device and identifying the hybrid wireless device based on the capability report.

12. The method of claim 1, further comprising detecting another loading condition on the first cell and assigning connected hybrid wireless devices to the second cell.

13. A method comprising:

deploying a first cell accommodating a first radio access technology (RAT) and a second RAT and a second cell dedicated to the first RAT, the first cell and the second cell having overlapping coverage areas;

monitoring resource usage on the first cell;

comparing the monitored resource usage on the first cell to a predetermined threshold and determining the monitored resource usage meets the predetermined threshold;

identifying a connected wireless device as a hybrid wireless device capable of communicating using the first RAT and the second RAT; and assigning the connected hybrid wireless device to the second cell dedicated to the first RAT when the monitored resource usage on the first cell meets the predetermined threshold, thereby prioritizing the second cell employing only the first RAT over the first cell accommodating multiple RATs.

14. The method of claim 13, further comprising receiving a connection request from a wireless device.

15. The method of claim 14, further comprising determining the wireless device is a hybrid wireless device and assigning the hybrid wireless device to the second cell.

16. The method of claim 14, further comprising determining the wireless device is not a hybrid wireless device and assigning the wireless device to the first cell.

17. The method of claim 13, wherein the first cell deploys a 5G RAT and a 4G RAT and the second cell deploys only the 5G RAT.

18. The method of claim 13, further comprising deploying the first cell as a dynamic spectrum sharing (DSS) cell and dynamically managing resources available for each of the first RAT and the second RAT.

19. An access node comprising:

a first antenna deploying a first cell accommodating a first radio access technology (RAT) and a second RAT;

a second antenna deploying a second cell accommodating only the first RAT, the first cell and the second cell having overlapping coverage areas; and a processor programmed to perform multiple operations including:

monitoring resource usage on the first cell;

determining that the monitored resource usage on the first cell meets a predetermined threshold;

identifying a hybrid wireless device capable of communicating using the first RAT and the second RAT; and assigning the hybrid wireless device to the second cell dedicated to the first RAT when the monitored resource usage on the first cell meets the predetermined threshold, thereby prioritizing the second cell employing only the first RAT over the first cell accommodating multiple RATs.

20. The access node of claim 19, further comprising deploying the first cell as a dynamic spectrum sharing (DSS) cell and dynamically managing resources available for each of the first RAT and the second RAT.

* * * * *